Dec. 9, 1958   H. W. BOTELER   2,863,631
DIAPHRAGM VALVE
Filed Oct. 29, 1956   2 Sheets-Sheet 1

INVENTOR.
Henry W. Boteler
BY
David D. McKenney
ATTORNEY

Dec. 9, 1958  H. W. BOTELER  2,863,631
DIAPHRAGM VALVE

Filed Oct. 29, 1956  2 Sheets-Sheet 2

INVENTOR.
Henry W. Boteler
BY
David D. McKenney
ATTORNEY

United States Patent Office 2,863,631
Patented Dec. 9, 1958

2,863,631

DIAPHRAGM VALVE

Henry W. Boteler, East Greenwich, R. I., assignor to Grinnell Corporation, Providence, R. I., a corporation of Delaware Application October 29, 1956, Serial No. 619,024

9 Claims. (Cl. 251—331)

This invention relates to a clamping device for securing the bonnet and body of a diaphragm valve in aligned and assembled relation. According to this invention, a generally U-shaped clamping member having a threaded stud at its bight portion is utilized to clamp the valve bonnet to the valve body and the clamping member, body and bonnet are provided with cooperating portions which maintain the body and bonnet in alignment.

In prior diaphragm valve assemblies, one arrangement for securing the valve bonnet to the valve body has involved the use of threaded elements which extend through apertures in the flanges of both the bonnet and the body and which may also extend through the diaphragm. The flanges are usually each provided with at least four apertures to receive these threaded elements, thus necessitating the provision of at least eight holes. In another prior arrangement, the body carries a plurality of hinged bolts secured to the bonnet or to the body and which swing into engagement with a flange on the body (or bonnet, as the case may be). The use of such clamping arrangements presents, in many applications, several drawbacks. For example, an uneven distribution of clamping pressure on the periphery of the valve diaphragm usually results where the periphery is placed between and clamped by flanges on the body and bonnet. The reason for this is that it is difficult to make sure that each threaded element exerts the same clamping force.

Another disadvantage of the use of a plurality of threaded elements in clamping the bonnet to the valve body is the accumulation of dirt and other contamination on these elements in installations where such accumulation is most undesirable, as for example in the dairy industry, the beer industry, or other installations where a clean environment must be maintained. Both the openings for threaded elements and such elements themselves are prone to catch dirt and other contamination and their cleaning is often difficult.

Still another disadvantage of the prior art arrangements employing threaded elements has been that frequently the valve assembly is not easily and quickly disassembled because a plurality of threading operations is necessary.

It is an object of this invention to provide a clamping arrangement for a diaphragm type valve which will insure a uniform clamping pressure on the periphery of the diaphragm.

It is another object of this invention to provide a clamping arrangement for a diaphragm type valve which will facilitate cleaning the valve bonnet and valve body by eliminating certain clamping elements which the prior art has known and on which dirt and other contamination may collect.

It is another object of this invention to provide a clamping arrangement for a diaphragm type valve which provides for quick assembly and disassembly of the valve.

These and other objects will become apparent from the following description.

Figure 7:
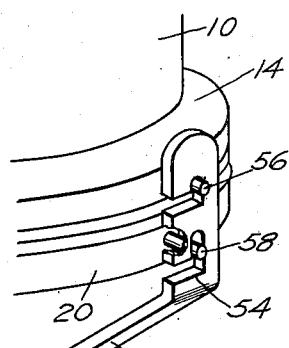
Fig. 7 is a perspective view showing a portion of a diaphragm valve assembly according to a fourth embodiment of the invention.

The embodiment of Figs. 1 to 4

Referring now to Figs. 1 to 4 of the drawings, the numeral 10 denotes the lower portion of a conventional bonnet element of a diaphragm type valve, the bonnet being provided with an integral flange 14 about its lower periphery. The numeral 16 denotes a conventional valve body element having substantially cylindrical end parts 16a and having a weir 17 across its flow passage 18. The body element is provided with an opening 19 having an integral flange 20 around its periphery. A diaphragm 21 and finger plate 22, of conventional construction, are both clamped at their peripheral portions between the flanges 14 and 20.

The numeral 24 denotes a symmetrical generally U-shaped clamping member having leg portions 26 and inturned end portions 28, the latter being preferably rounded on their bottom surfaces 30 for reasons which will later appear. Each leg portion 26 is also provided with aligning set screws 32 and 34. The bight portion of the clamp 24 receives a threaded stud 36 whose tip abuts a recess 38 (see Fig. 2) in the bottom of the valve body 16.

The bonnet flange 14 is provided at two diametrically opposite portions with integral bosses 40 which have aligning notches 44 extending inwardly from the edge thereof. (See Fig. 4 in which these bosses and notches are exaggerated for easier understanding.) Similarly the lower flange 20 is provided at two opposite portions with integral bosses 42 having aligning notches 48 likewise extending inwardly from the edge thereof. By the provision of the bosses 40 and 42, the notches 44 and 48 do not extend inwardly of the clamped periphery of the diaphragm.

Figure 4:
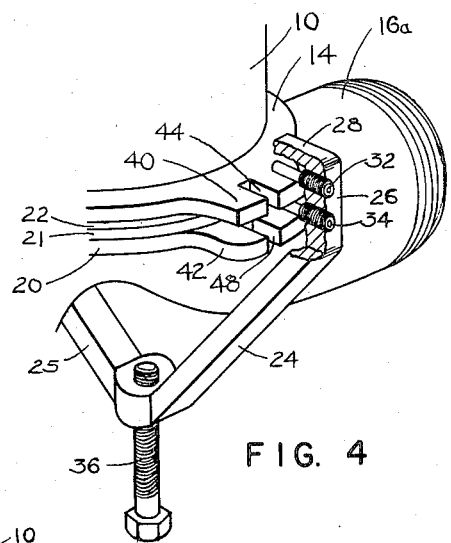
Fig. 4 is a perspective, partially broken away, of the embodiment shown in Fig. 1 with certain parts exaggerated and showing how the clamping member is inserted prior to its final positioning.

The valve assembly according to this embodiment of the invention is accomplished in the following manner. The bonnet 10 is placed on the body 16 with the diaphragm 21 and finger plate 22 between the bonnet flange 14 and body flange 20. The clamping member 24 is separate from the bonnet and body and is prepared for assembly with the bonnet and body by unscrewing the threaded stud 36 at least an amount which will be understood presently. The clamping member is brought into assembly by first placing it below one of the cylindrical end parts 16a and then moving it upward (as seen in Fig. 4) so that the ends 28 of the clamping member pass on opposite sides of this cylindrical end part 16a. Thus the clamping member ends 28 are spaced apart by a distance greater than the diameter of the cylindrical end parts. Next the clamping member 24 is moved parallel to the axis of the cylindrical body end parts until the alignment set screws 34 pass between the bosses 40 and 42 and lie directly over the lower notches 48. Fig. 4 shows these set screws 34 between the bosses 40 and 42 but in a position to one side of the notches 48. This showing is to illustrate the positions of the parts just before final movement of the clamping member along the axis of the cylindrical body end parts to a position in which the set screws 34 are above the notches 48. When the clamping is at the end of its "axial" movement, it is lowered until the rounded surfaces 30 of inturned portions 28 abut the flange 14, the set screws 32 being snugly received in notches 44 and the set screws 34 being snugly received in notches 48. The threaded stud element 36 is now turned until its tip abuts the recess 38 in the lower part of the valve body 16. The cooperation between the rounded clamping member surfaces 30 and the threaded stud 36 draws the body and bonnet elements together, and the cooperation between the aligning notches and the aligning pins aligns the body with respect to the bonnet. The valve assembly is now complete and to effect disassembly the reverse operation is employed.

The recess 38 is symmetrically located with respect to those portions of the bonnet flange 14 which the rounded clamping member surfaces 30 engage, so that a uniform distribution of clamping force on the peripheries of the diaphragm and finger plate is assured.

The surfaces 30 on the inturned portions 28 of the clamping member are rounded to locate the area of such portions which engages the flange 14 at about the middle of these portions. Thus if these portions had flat surfaces errors in manufacture might result in the areas which engages the flanges being at the sides of the portions thereby resulting in non-symmetrical clamping action.

Figure 5:
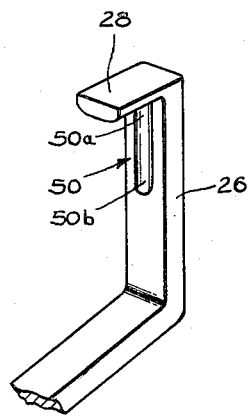
Fig. 5 is a perspective showing the upper detail of a second embodiment of the clamping member.

*The embodiment of Fig. 5*

In Fig. 5 of the drawings another embodiment of the clamping member per se is shown where in the aligning set screws 32 and 34 have been replaced by integral raised ribs 50. The upper portions 50a of the ribs 50 are received by the aligning notches 44 and the lower portion 50b is received by the aligning notches 48. The upper leg portions 26 and stud 36 must be made somewhat longer than in the embodiment shown in Figs. 1 to 4 because in assembly and disassembly the lower portion 50b and the rib 50 must be raised high enough to clear the upper notches 44 before the clamping element 24 can be moved sideways from the valve assembly. In other respects, this embodiment is similar to that of Figs. 1 to 4.

Figure 6:
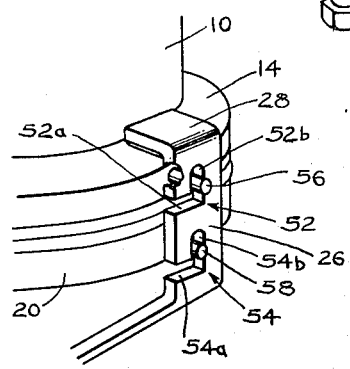
Fig. 6 is a perspective showing a portion of a valve assembly according to a third embodiment of the invention.

*The embodiment of Fig. 6*

In Fig. 6 of the drawings, a third embodiment of the invention is shown wherein the clamping member leg portions 26 are provided with aligning slots 52 and 54 instead of the pins 32 and 34, each of these slots having portions 52a and 54a which extend laterally inwardly from one side of the leg portions 26 and portions 52b and 54b which extend longitudinally along the leg portions 26 from the inner ends of the lateral slot portions 52a and 54a. The bonnet flange 14 is provided with outwardly extending aligning pins 56 on opposite sides of the bonnet and the body flange 20 is provided with outwardly extending aligning pins 58 on opposite sides of the body. When the valve is completely assembled the slot portions 52b snugly receive pins 56 and the slot portions 54b snugly receive pins 58. In assembling the clamp in this embodiment the initial steps are substantially the same as in the case of the embodiment of Figs. 1 to 4. The clamping member 24 is moved parallel to the valve axis until the pins enter and move to the inner ends of the laterally extending slot portions 52a and 54a. The clamping member is then moved longitudinally until the aligning pins are well within the longitudinally extending slot portions 52b and 54b and the rounded surfaces 30 abut the flange 14. Then the stud 36 is turned until its tip abuts the recess 38. The cooperation between the rounded surfaces 30 and the stud 36 clamps the bonnet to the body and the cooperation between the aligning slots and the aligning pins align the bonnet and body.

The longitudinally extending slot portions 52b and 54b are made long enough so that when the rounded surfaces 30 on the inturned end portions 28 engage the flange 14 the pins 56 and 58 are spaced from the closed ends of these slot portions. This spacing is preferred in the case of slots 52 to assure that the clamping force is exerted by the inturned end portions 28 on the flange 14 rather than by the closed ends of the slot portions 52b on the pins 56; and this spacing is required in the case of slot 54 to assure that the clamping member is free to draw the bonnet toward the body to clamp the diaphragm without the pins 58 engaging the closed ends of slots 54b and acting as stops against further desirable clamping movement of the bonnet toward the body.

*The embodiment of Fig. 7*

In Fig. 7 of the drawings a fourth embodiment of the invention is shown. This embodiment is similar to the one shown in Fig. 6, with the difference that the inturned leg portions 28 of Fig. 6 have been omitted. The upper aligning slots 52 here serve a dual function, i. e., their portions 52b align the pins 56 with the pins 58 when the threaded stud 36 is tightened against the recess 38 in the valve body, and in addition the closed ends of slot portions 52b engage pins 56 and thereby draw the bonnet toward the body so that inturned end portions like portions 28 in Fig. 6 are unnecessary. The manner of assembly of this embodiment is substantially the same as in the embodiment of Fig. 6.

Figure 8:
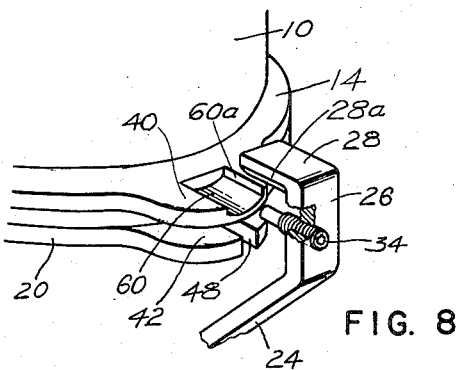
Fig. 8 is a perspective, partially broken away, showing the diaphragm valve assembly of a fifth embodiment of the invention just prior to the final positioning of its clamping member.
Figure 1:
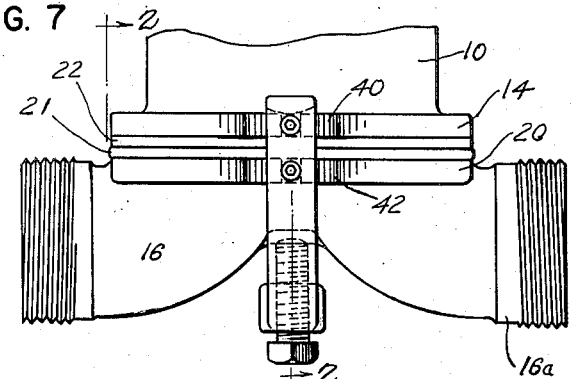
Fig. 1 is a side elevation of a diaphragm type valve assembly showing one embodiment of this invention.
Figure 2:
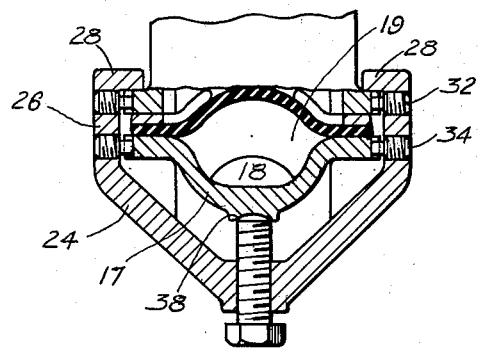
Fig. 2 is a view taken along line 2—2 of Fig. 1.
Figure 3:
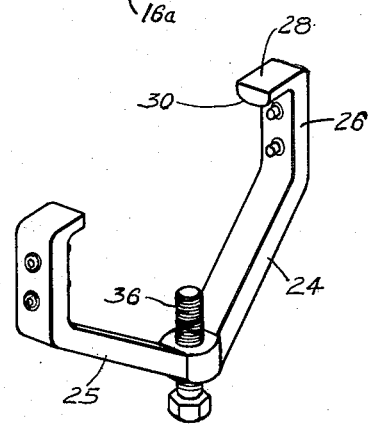
Fig. 3 is a perspective of the embodiment of the clamping member of Fig. 1.

*The embodiment of Fig. 8*

In Fig. 8 of the drawings; a fifth embodiment of the invention is illustrated. The flange 14 is provided on opposite sides of the bonnet with bosses 40 which are in turn provided with recesses 60, the body flange 20 is provided with bosses 42 which are in turn provided with notches 48 on opposite sides of the body. It will be noted that recesses 60 do not extend completely through the bosses 40. This embodiment is similar to the one illustrated in Figs. 1 to 4 of the drawings except that the upper set screws 32 have been omitted. The lower set screws 34 snugly engage the sides of the notches 48, as in Figs. 1 to 4. However, lower parts 30 of the inturned leg portions 28 here fit snugly into the recesses 60 and engage the bottom surfaces of these recesses. The manner of assembly is substantially the same as that described with reference to Figs. 1 to 4.

The cooperation between the inturned leg portions 28 and the recesses 60 is twofold. First, the lower parts 30 of the inturned leg portions 28 bear against the bottoms of the recesses 60 when the threaded stud 36 is screwed against recess 38, thus clamping the bonnet to the body. Second, the sides 28a of the inturned leg portions 28 snugly engage the sides 60a of the recesses 60 and thus cooperate with the set screws 34 and notches 48 to align the bonnet with respect to the body.

Although the clamping member in various of the described embodiments are shown provided with set screws for aligning purposes, it is not necessary to move these set screws once they have been properly located. Accordingly, ordinary pins, like the pins 56 and 58, may be used instead of the set screw and non-adjustably secured to the clamping member.

Those portions of the set screws or pins (whether secured to the clamping member, to the bonnet or to the body) which are received in the several aligning notches are preferably made smooth in order that their engagement with the sides of these notches will be snug and good alignment of the bonnet and valve will result.

A characteristic of the invention is the bayonet-type connection between the aligning portions on the bonnet, body and clamping member. This connection requires, in assembling the bonnet and body elements, that the clamping member be moved parallel to the plane of the diaphragm and thence at right angles to simultaneously effect engagement between the aligning portions of the bonnet, body and clamping member and prevent the clamping member from sliding off of the bonnet and body elements. In disassembling the bonnet and body elements, the reverse procedure is necessary, that is, the clamping member must be moved in a direction transversely to the plane of the diaphragm and thence towards one of the cylindrical end portions of the body element.

The clamp assembly described in the foregoing description of the illustrated embodiments of the invention yields several advantages not enjoyed by prior assemblies. For example, though not by way of limitation, disassembly of the valve and removal of the bonnet, diaphragm and clamping member of this invention will leave a valve body free of bolt holes or hinged latch elements which are difficult to clean. This is particularly advantageous in those applications where the outside surfaces of the valves must be cleaned, for example in the milk industry. With the present invention the valve body, which remains in the line when the bonnet, diaphragm and clamping member are removed, is easier to clean than a body with bolt holes in the flange or with even more complex clamping devices, and the bonnet and clamping member are likewise easy to clean while separated from the body, as is apparent from the clamping arrangement.

Another advantage of the invention lies in the fact that the valve is easier to clean while still assembled than prior valves employing conventional bolts. The reason for this is that the bolts obstruct cleaning up to the edge of the diaphragm when they pass by the outside of the diaphragm periphery and they form crevices with the flanges and with the diaphragm when they pass through holes in the diaphragm. In distinction, the present invention leaves substantially the entire diaphragm edge unobstructed and minimizes the formation of crevices.

In addition an advantage enjoyed by the present invention is that the clamping is achieved by actuating a single force exerting element, which, in the embodiments shown, is a threaded stud. This makes assembly and disassembly very rapid which is a distinct advantage when frequent valve cleaning is required. Also this single force exerting element or wedging member results in uniformity of clamping force exerted on the diaphragm. Furthermore, a single force exerting element minimizes the number of loose parts which must be employed. Thus, it will be noticed that the threaded stud needs only to be threaded part-way along the clamping member to disassemble the valve. No parts need be actually separated from each other except the bonnet, body and clamping member. There are no nuts to be threaded completely off of studs.

Another advantage of devices constructed in accordance with the invention is that the clamping member is positively locked in its proper position when the bonnet is clamped to the body. This locking is not merely a friction type arrangement which can be dislodged by a heavy blow. The same elements which provide alignment prevent dislodging of the clamping member. It is necessary to relieve the clamping force before removing the clamping member so that accidental blows or vibrations cannot misalign or completely unclamp an assembled valve.

I claim:
1. A diaphragm valve assembly including: a valve body element having substantially cylindrical end portions and having an opening at the center and on one side thereof, said opening being surrounded by a flange; a diaphragm disposed across said opening; a valve bonnet element covering said opening, said bonnet element also having a flange, the periphery of said diaphragm being clamped between said flanges, said bonnet including abutment portions and alignment portions on opposite sides of said valve body opening; alignment portions on said body also on opposite sides of said opening; a clamping member having ends which are spaced apart by an amount greater than the outside diameter of said cylindrical end portions, said ends overlying and abutting the said bonnet abutment portions; a force exerting element between said clamping member and said valve body engaging the latter on its side thereof opposite said opening, said force exerting element moving said clamping member with respect to said body to thereby clamp the bonnet element to the body element; and aligning portions carried by the clamping member cooperating with the said bonnet and body alignment portions to align the said bonnet and body elements, said alignment portions on the bonnet, body and clamping member constituting a bayonet-type connection, whereby said clamping member is movable in a direction towards one of the said cylindrical end portions only after it has been moved a predetermined distance in a direction substantially transversely of the plane of the said diaphragm.

2. The assembly of claim 1 wherein the ends of the said clamping member are inwardly turned.

3. The assembly of claim 1 wherein; the said bonnet alignment portions are distinct from said bonnet abutment portions.

4. The assembly of 1 wherein; the said bonnet alignment portions are coincident with said bonnet abutment portions.

5. The assembly of claim 1 wherein; the ends of the said clamping member are inwardly turned and abut portions of the bonnet flange, these portions being the bonnet abutment portions; the bonnet alignment portions are notches extending inwardly from the edge of the bonnet flange; the said body alignment portions are notches in the body flange which extend inwardly from the edge thereof; the said aligning portions carried by the clamping member are pins which engage the sides of the said bonnet and body notches.

6. The assembly of claim 1 wherein; the ends of the said clamping member are inwardly turned and abut portions of the bonnet flange, these portions being the bonnet abutment portions; the bonnet alignment portions are laterally extending pins carried by the bonnet flange; the said body alignment portions are also laterally extending pins; the said aligning portions carried by the clamping member are slots the sides of which abut the said bonnet and body pins.

7. The assembly of claim 1 wherein; the said bonnet abutment and alignment portions are coincident and are laterally extending projections; the said body alignment portions are laterally extending projections; the ends of the said aligning portions carried by the clamping member are slots the top and sides of which abut the said bonnet projections; the aligning portions carried by clamping member are slots the sides of which engage the said body alignment projections.

8. The assembly of claim 1 wherein; the ends of the clamping member are inwardly turned and are seated in and engage the sides of recesses being the bonnet abutment and alignment portions; the body alignment portions are notches extending inwardly from the edge of the said body flange; the aligning portions carried by the said clamping member are pins which are received in and engage the sides of said notches in the body flange and are the sides of the said inturned ends of the clamping member which engage the sides of the said recesses in the bonnet flange.

9. The assembly of claim 1 wherein; the ends of the said clamping member are inwardly turned and abut portions of the bonnet flange, these portions being the bonnet abutment portions; the said bonnet alignment portions are notches extending inwardly from the edge of the bonnet flange; the said body alignment portions are notches in the body flange which extend inwardly from the edge thereof; the said aligning portions carried by the clamping member are continuous raised ribs the sides of which engage the sides of the bonnet and body notches.

References Cited in the file of this patent

UNITED STATES PATENTS

| | | |
|---|---|---|
| 134,548 | Hoadley | Jan. 7, 1873 |
| 289,374 | Barter | Dec. 4, 1883 |
| 602,281 | Cahill | Apr. 12, 1898 |
| 1,369,969 | Fairbanks | Mar. 1, 1921 |